Oct. 21, 1941.     R. W. GLASNER     2,259,882
PRESS
Filed July 13, 1939     9 Sheets-Sheet 1
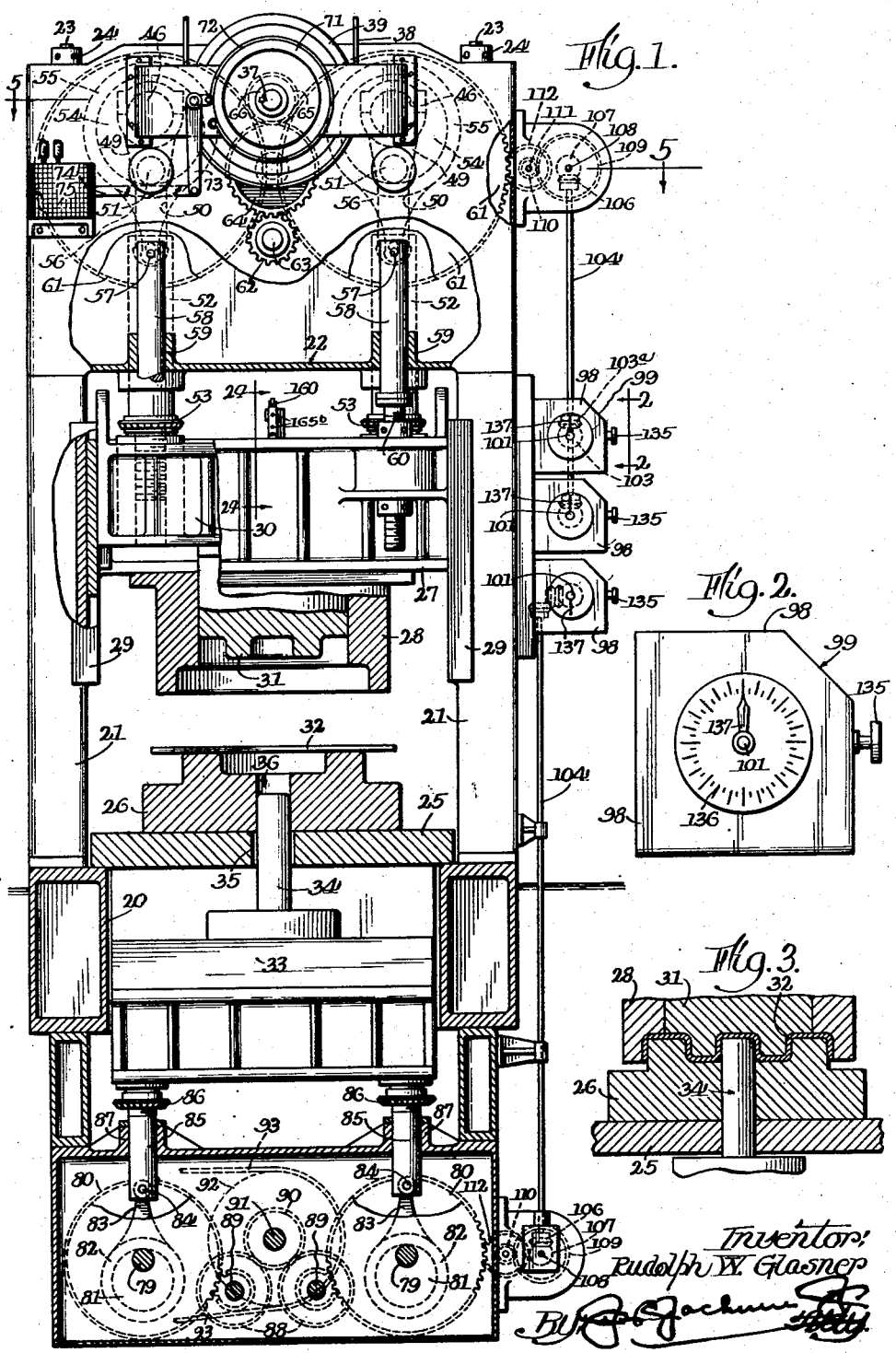

Oct. 21, 1941.  R. W. GLASNER  2,259,882

PRESS

Filed July 13, 1939  9 Sheets-Sheet 3

Inventor:
Rudolph W. Glasner.
By

Oct. 21, 1941.  R. W. GLASNER  2,259,882
PRESS
Filed July 13, 1939  9 Sheets-Sheet 4

Inventor
Rudolph W. Glasner
By [signature]
Atty

Oct. 21, 1941.  R. W. GLASNER  2,259,882
PRESS
Filed July 13, 1939   9 Sheets-Sheet 5
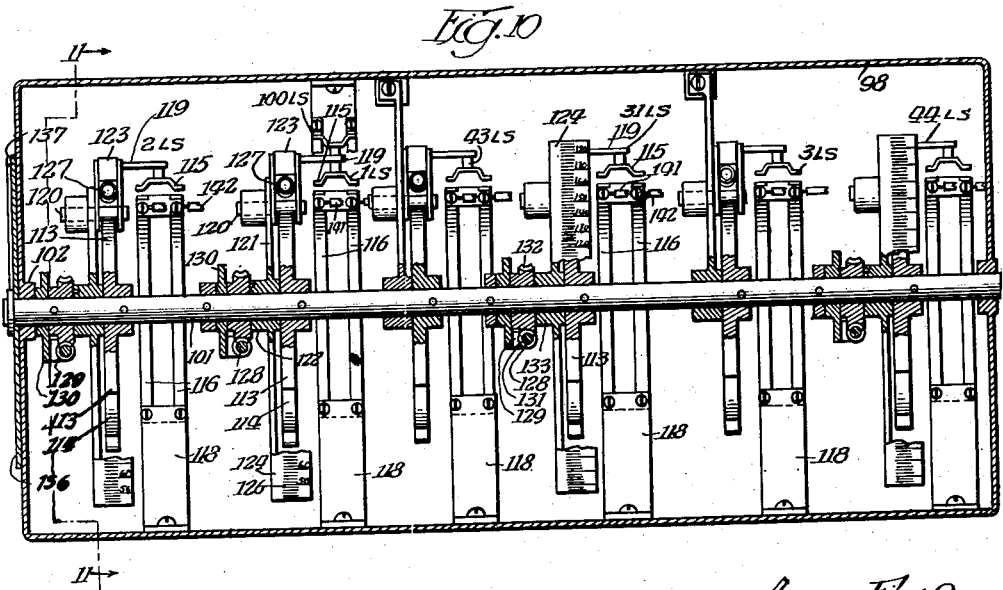
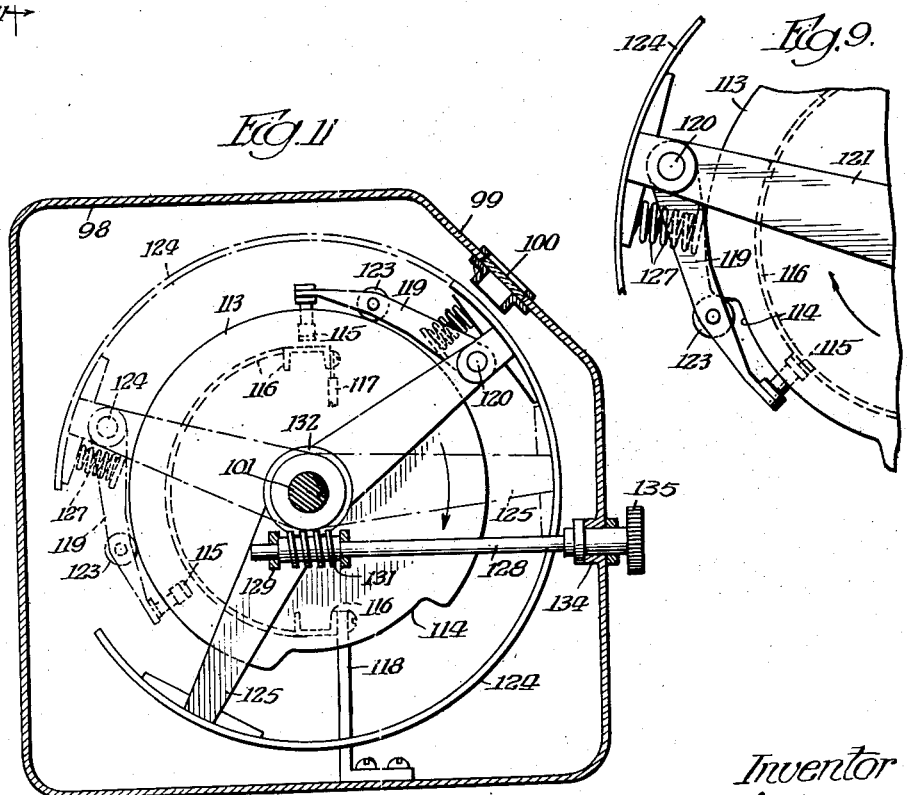
Inventor
Rudolph W. Glasner
By Oct. 21, 1941. R. W. GLASNER 2,259,882
PRESS
Filed July 13, 1939 9 Sheets-Sheet 6
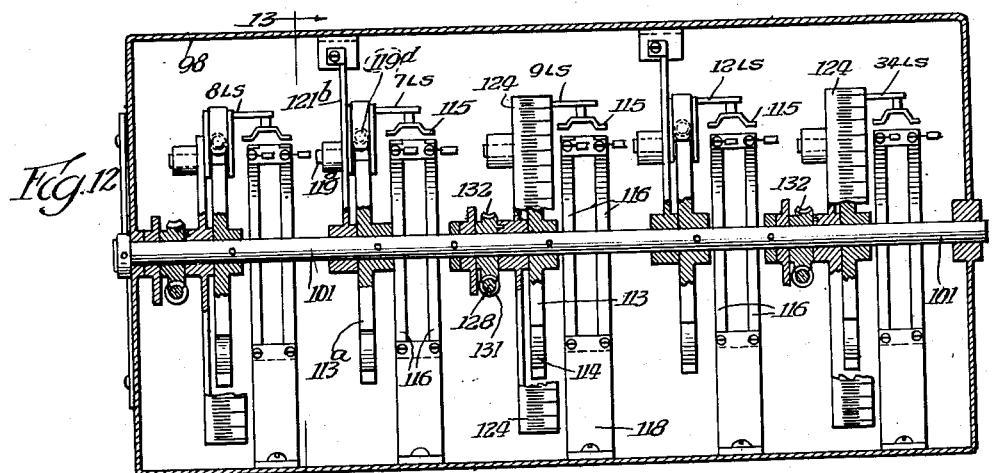
Fig.12
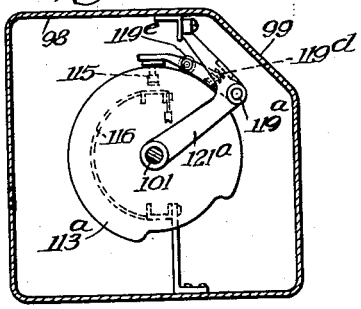
Fig.13
Fig.15 OPERATION 1
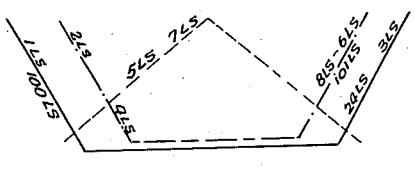
Fig.16 OPERATION 2
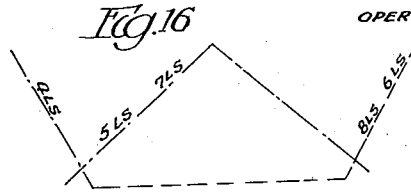
Fig.17 OPERATION 3
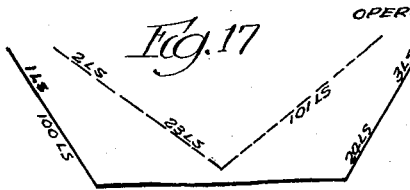
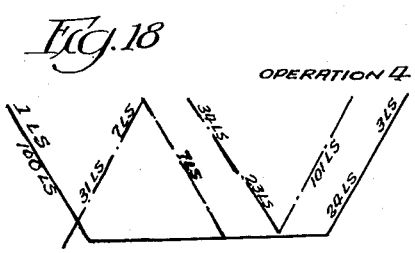
Fig.18 OPERATION 4
Fig.19 OPERATION 5
Fig.20 OPERATION 6
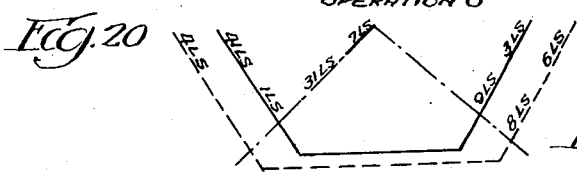
Inventor
Rudolph W. Glasner

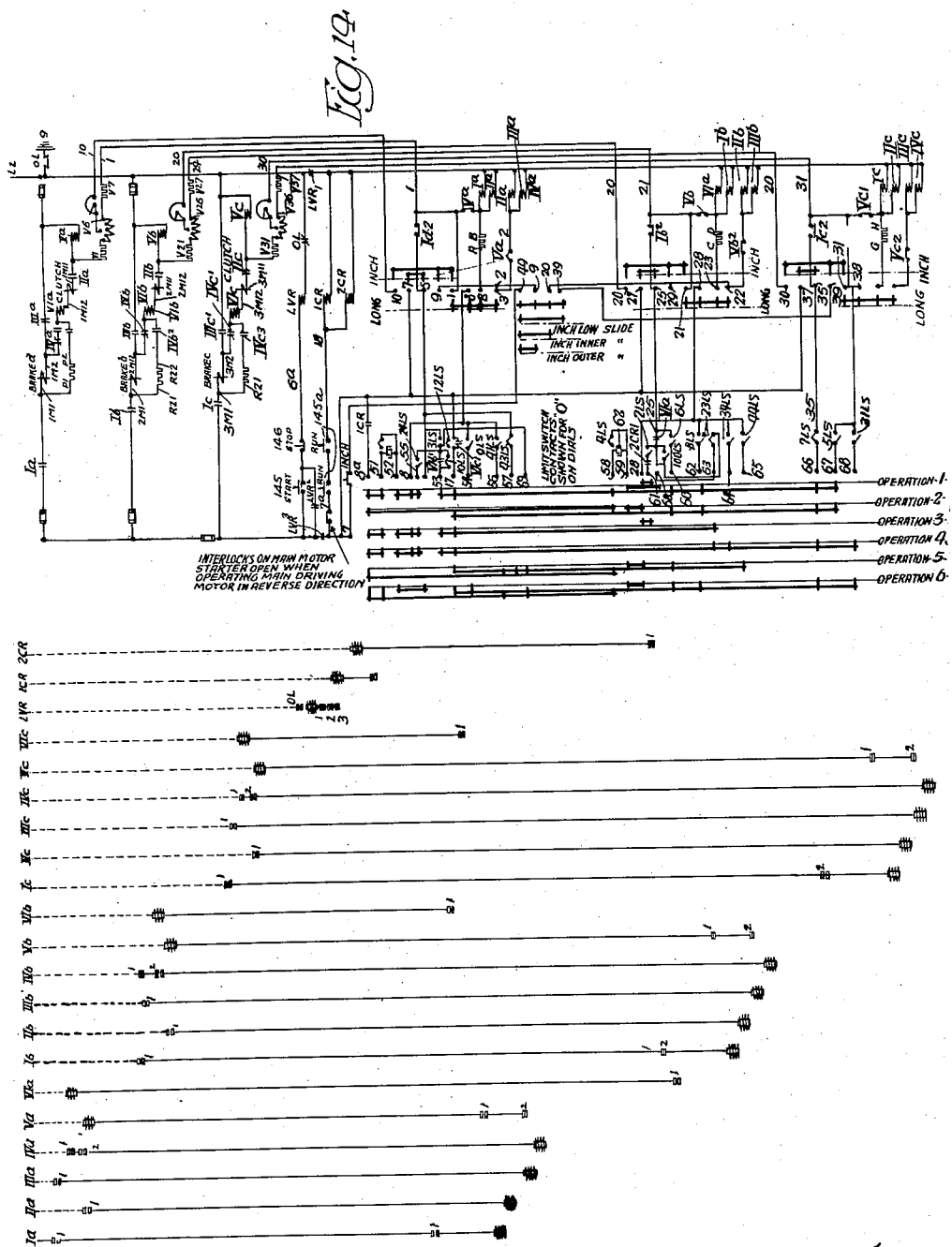

Oct. 21, 1941.          R. W. GLASNER          2,259,882
PRESS
Filed July 13, 1939          9 Sheets-Sheet 8
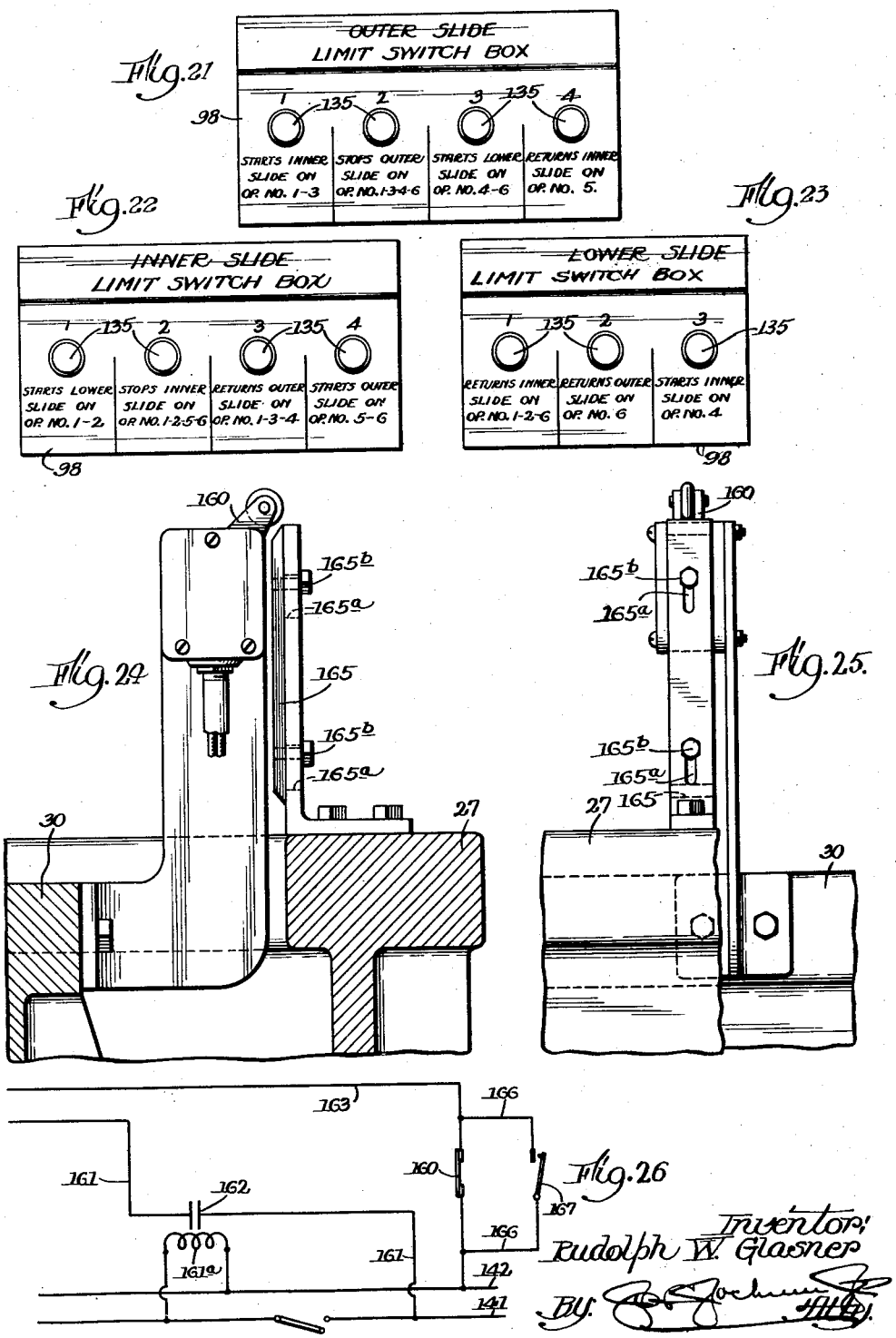

Oct. 21, 1941.   R. W. GLASNER   2,259,882
PRESS
Filed July 13, 1939   9 Sheets-Sheet 9

Inventor
RUDOLPH W. GLASNER
By
Attorney.

Patented Oct. 21, 1941

2,259,882

UNITED STATES PATENT OFFICE 2,259,882

PRESS

Rudolph W. Glasner, Chicago, Ill.

Application July 13, 1939, Serial No. 284,242

16 Claims. (Cl. 113—38)

This application is a continuation in part of application Serial #51,781 filed November 22, 1935.

This invention relates in general to power presses, and more particularly to large presses of the type in which there is employed a plurality of reciprocable die or tool carrying slides.

Heretofore in presses of this character the movements of the slides with respect to each other in each cycle of operation of the press have been fixed, so that after one slide has been moved a predetermined distance on the operative stroke, the second slide will commence its movement, and on the return stroke the movements of the slides with relation to each other are also fixed. Such movements as well as the order or sequence of movement of the slides with respect to each other could not be varied without stopping the operation of the press, the operator then performing some adjustment of the parts, whereby the desired order or sequence of operation may be obtained.

It is one of the objects of the present invention to provide in a press of this character a plurality of slides, each provided with its own actuating mechanism, and improved means adapted to be so set that any predetermined order or sequence of any operation of the slides may be obtained, and which means renders it also possible for the operator to render any one or more of the slides inactive while the remaining slide or slides will remain active.

A further object is to provide improved adjustment mechanism, whereby not only any predetermined order or sequence of operation of the slides may be obtained, but the respective slides may be caused to dwell for any predetermined period of time in the cycle of operation of the press, and with respect to each other, such periods of dwell, and the periods of motion, being adapted to be selectively varied.

A further object is to provide improved means to insure that the lower face of the outer slide will, in operation, never be less than a set minimum distance below the lower face of the inner slides.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which Figure 1 is a view partly in elevation, partly in section, and partly broken away, of a press of this character constructed in accordance with the principles of this invention.

Figure 2 is an end elevation of one of the limit switch boxes.

Figure 3 is a view partly in elevation, partly in section, and with parts omitted, of the dies or tools showing the manner of performing an operation upon the work.

Figure 7 is a detail sectional view on line 7—7, Figure 8, of the inner slide limit switch box.

Figure 8 is a detail sectional view taken on line 8—8 showing double contact limit switches which are not adjustable from the outside of the switch box.

Figure 9 is a detail view in elevation of portions of one of the limit switches showing the parts in different positions from the position shown in Figure 8.

Figure 10 is a sectional view similar to Figure 7 of the outer slide limit switch box.

Figure 11 is a detail sectional view, on an enlarged scale, taken on line 11—11 Figure 10.

Figure 12 is a sectional view similar to Figures 7 and 10 of the lower slide limit switch box.

Figure 13 is a detail sectional view on an enlarged scale taken on line 13—13 Figure 12.

Figure 14 is a simplified wiring diagram of the clutch and brake control circuits employed to illustrate the operation of the invention and also a key diagram showing the switches in spindle form with the contacts and coils arranged on the spindle in horizontal alinement with the corresponding contacts and coils in the wiring diagram.

Figure 14—A is a key diagram for Figure 14 in spindle form showing the parts arranged on the spindles in horizontal alinement with the corresponding parts in the wiring diagram.

Figures 15 to 20 are cyclographs of six different operations adapted to be performed by reason of this invention.

Figures 21, 22 and 23 are diagrammatic illustrations of the fronts of the limit switch boxes indicating the positions in which the various switch mechanisms are set to produce the operations shown in the cyclograph in Figures 15 to 20.

Figure 24 is a detail sectional view taken on line 24—24 Figure 1, on an enlarged scale, of the inner slide limit switch.

Figure 25 is a right hand end elevation of Figure 24.

Figure 26 is a wiring diagram of the inner slide limit control switch.

Figure 27 is a wiring diagram of the circuit employed for the "inching" operation of the slide.

Figure 28 is a wiring diagram of one of the circuits for the clutch and brake.

Figure 4:
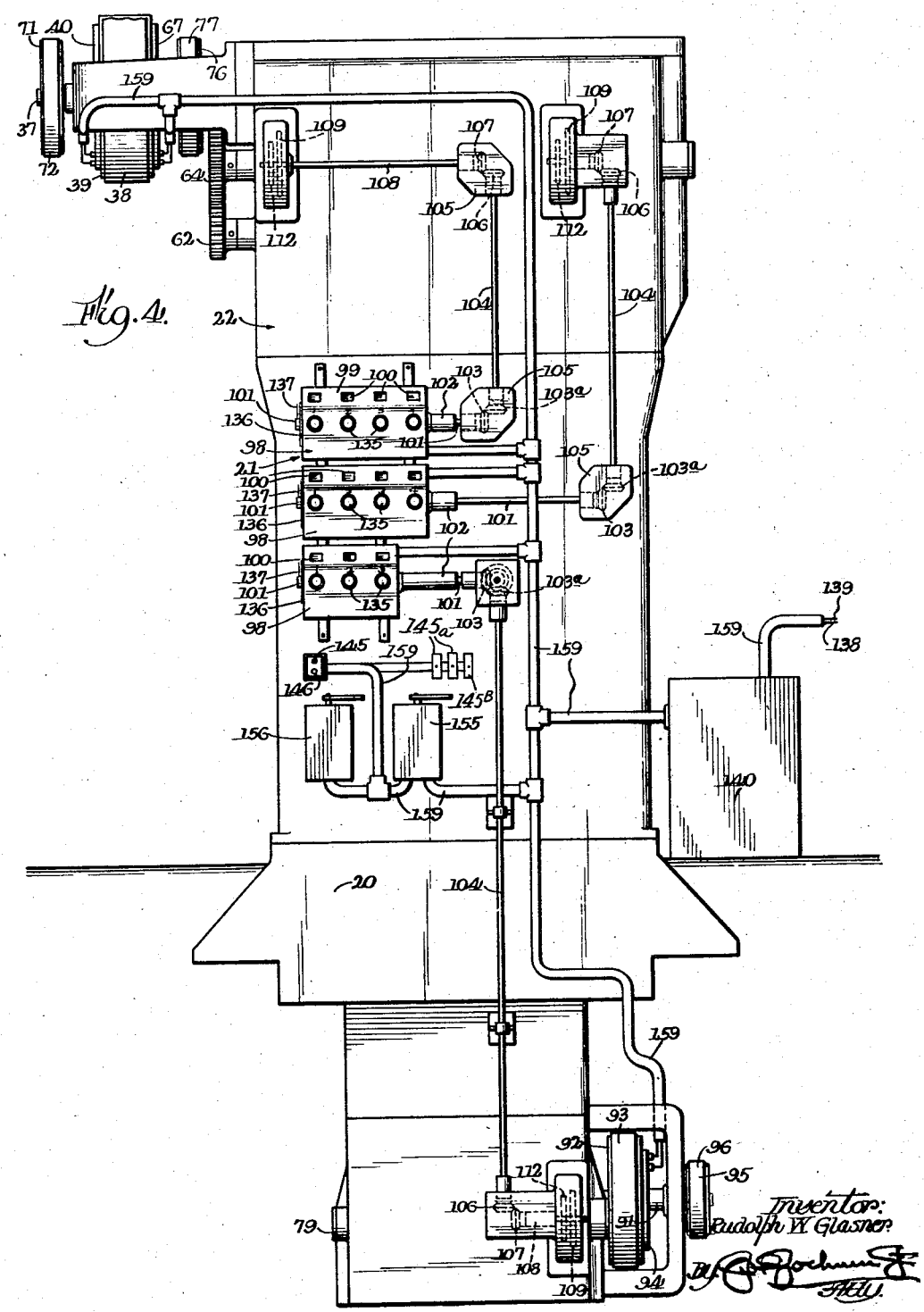
Figure 4 is a right hand end elevation of Figure 1.

In the drawings, there is shown a press frame which is preferably of a built-up or sectional construction comprising a base portion 20, uprights 21, and a crown 22 fastened together in any suitable manner, but preferably by means of tie rods 23 passing through the members, any number of which may be provided, and on the ends of which tie rods are nuts or collars 24.

The press frame may be of any desired size and configuration but the chown 22 thereof is preferably hollow as is also a portion of the base 20, and in which hollow portions the operating mechanisms for the respective slides are housed, so that a lubricant may be placed therein, and in which lubricant the operating gears, or the parts constituting the actuating mechanisms for the slides, operate.

The numeral 25 designates a bed plate suitably mounted within the frame, and mounted upon the bed plate 25 and secured in position in any suitable manner, is a die 26 of any suitable configuration.

Above the bed plate 25 is arranged a slide 27 which carries a die or tool 28, the slide 27 constituting what might be termed an outer slide, which is reciprocable upon suitable guides 29 carried by the uprights 21.

Within the slide 27 is an inner slide 30 which is guided in its movements by the walls of the outer slide, and carried by the inner slide 30 is a tool or die 31.

The die or tool 28 co-operates with the die 26 to serve as a blank holder for the work 32, as shown more particularly in Figure 3, and the die or tool 31 also co-operates with a portion of the die 26 to shape the work, as is common in presses of this character.

Below the bed 25 is another reciprocable slide 33 guided by a portion of the frame of the press, and carried by this slide 33 is a tool or member 34 which is adapted to pass through a suitable opening 35 in the bed plate 25 and also through an opening 36 in the die 26 to co-operate with another portion of the die 31 to perform another operation upon the work 32.

Figure 5:
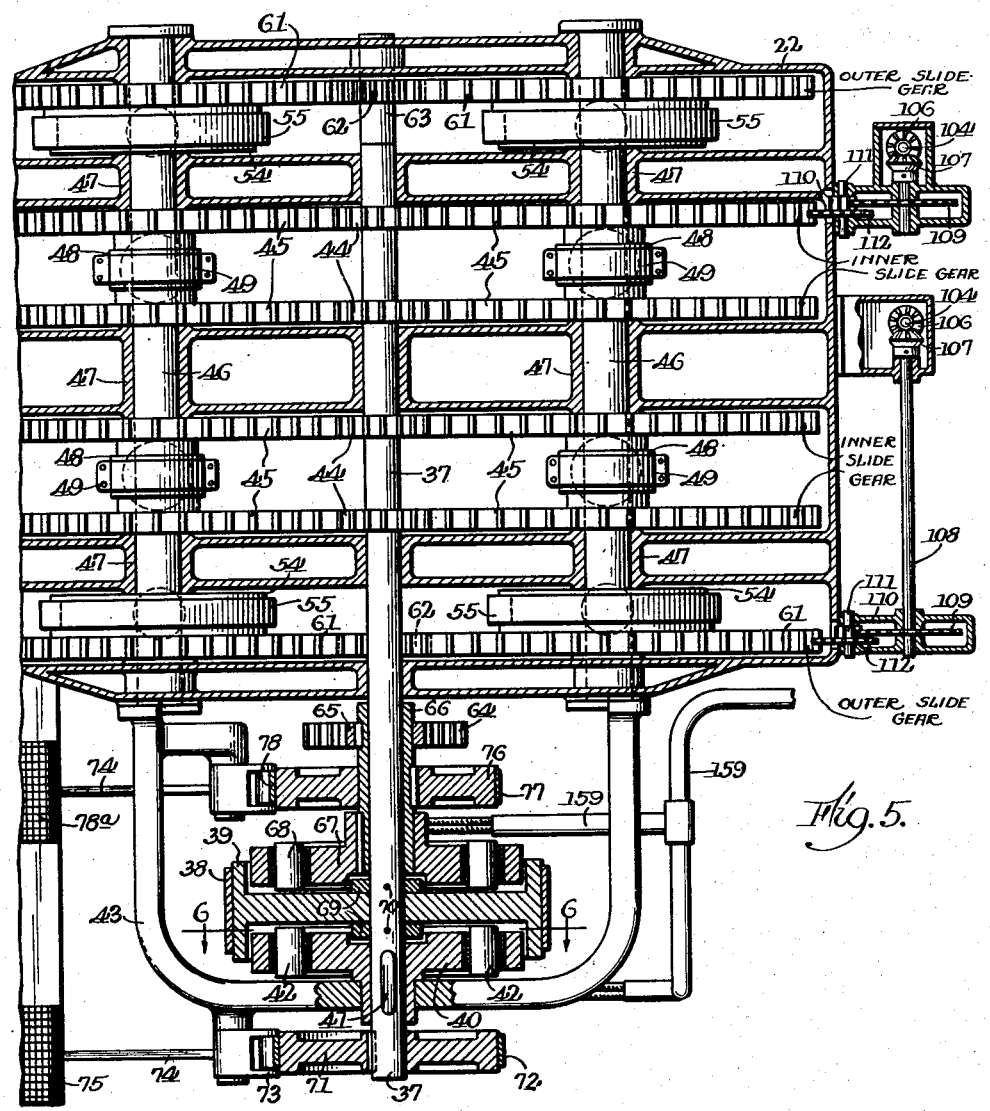
Figure 5 is an irregular, horizontal, sectional view taken on line 5—5, Figure 1.
Figure 6:
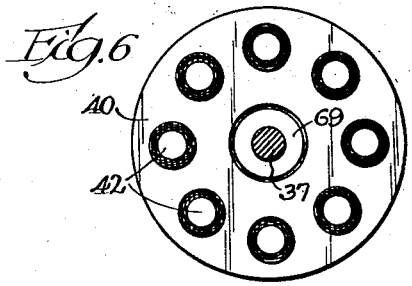
Figure 6 is a detail sectional view on line 6—6, Figure 5, with parts omitted.

Journaled in suitable bearings and preferably disposed within and extending across the crown 22, is a main driving shaft 37, driven from any suitable source of power, preferably through the medium of a drive belt 38 passing over a pulley 39 that is mounted upon the shaft 37 for free rotation with respect thereto, but which is adapted to be coupled and uncoupled from the shaft by means of a clutch member 40 that is keyed to the shaft 37 as at 41 (see particularly Figure 5). The clutch here shown is of the magnetic type provided with magnets 42 adapted to be energized and when so energized will cause the pulley 39 to be locked to the shaft, but when de-energized, the pulley 39 will rotate freely with respect to the shaft. One end of the shaft 37 projects beyond the wall of the crown 22 of the press and may be journaled in a suitable bracket 43. Secured to the shaft 37 for rotation therewith and within the crown 22 are pinion gears 44 which mesh with gears 45 rotatable about shafts 46 supported in suitable bearings 47 and in the walls of the crown 32.

Eccentrically connected with the gears 45 as at 48, are arms 49 which in turn are connected by means of links 50 to the inner slides 30, the links having pivotal connection at one end as at 51 with the arms 49 and at their other ends are pivotally connected to members 52 that slide through suitable bearings in the bottom of the crown 22 and are adjustably connected by means of an adjustable connecting device 53 with the inner slide 31. This will cause a reciprocation of the inner slide when the gears 45 are rotated and the inner slide will be supported by means of a four point suspension, the members 52 being secured to the slide 30 at the four corners thereof.

Mounted also upon the shafts 46 for rotation with respect thereto are eccentrics 54 co-operating with which are eccentric straps 55, having arms 56. Pivotally connected with each of the arms 56 as at 57 are upright members 58 which pass through suitable bearings 59 in the bottom of the crown 22 and are adjustably connected as at 60 with the outer slide 27 and constitute a four-point suspension for the outer slide, as one of the members 58 is connected to the slide 27 at each corner thereof.

Connected to each of the eccentrics 54 is a gear 61 which are rotatable with respect to the shafts 46 and impart rotation to the eccentrics. These gears 61 are driven by means of pinion gears 62 secured to a shaft 63 whereby upon rotation of the shaft 63, the gears 61 will be rotated, and this rotation through the medium of the eccentrics 54, eccentric straps 55 and the connections with the outer slide 27 will cause a reciprocation of the latter.

The shaft 63 is rotated by means of a gear 64 suitably mounted, and which latter meshes with the pinion gear 62 on the shaft 63, and the gear 64 meshes with a pinion gear 65 secured to a sleeve 66 for rotation therewith. This sleeve 66 is mounted upon the shaft 37 for free rotation with respect thereto, and secured to the sleeve 66 (see also Figure 5) for rotation therewith, is another clutch member 67, similar to the clutch member 40. The clutch member 67 is provided with a series of magnets 68 adapted to be energized and when energized will cause the pulley 39, adjacent which the elements 68 as well as the elements 40 are disposed, to lock the sleeve 66 for rotation with the pulley 39, but when the elements 68 are de-energized the clutch member 67 will be released from the pulley 39 and will stand idle with respect to the shaft 37.

The pulley 39 may be held in position in any suitable manner, preferably by means of collars 69 encompassing the shaft 37, and disposed on opposite sides of the pulley, fastening devices or pins 70 may be provided for securing the pulley 39 against lateral movement in directions lengthwise of the axis of the shaft 37.

Thus it will be seen that when the clutch members 40 and 67 are locked to the shaft 37 through the medium of the electro-responsive devices 42 and 68 and the shaft 37 is rotated, motion will be imparted to the mechanisms to cause the outer slide 27 and the inner slide 30 to be reciprocated.

Similarly, when one or the other of these slides is rendered active or inactive with respect to the operating mechanism, it will be reciprocated or will remain idle.

Therefore, in order to control the cycle of operation or reciprocation of the slides 28 and 30 with respect to each other, so as to cause them to move in unison, or one in advance of the other, or cause one to remain idle while the other reciprocates, the clutch devices 40 and 67 are to be controlled in a manner to be hereinafter set forth.

If desired, and in order to provide a brake device for stopping the mechanism and for preventing overthrow, there may be secured to the shaft 37 a brake pulley 71 with which a brake band 72 co-operates, and this brake band may be controlled by a lever 73 (see particularly Figure 1) to which a member 74 is connected, and which member in turn may be connected to the armature of an electro-responsive device 75.

Similarly, a brake pulley 76 may be secured to the sleeve 66 and a brake band 77 may be provided for the pulley 76, and an operating lever 78 and construction similar to the parts 73, 74 and 75, may be provided for rendering this brake active or inactive.

The lower slide 33 may be reciprocated in a manner similar to the manner of reciprocation of the upper slides, and to that end there may be provided shafts 79 upon which gears 80 may be mounted and to these gears 80 and for rotation therewith are connected eccentrics 81. Eccentric straps 82 co-operate with the eccentrics and the straps are provided with arms 83 which are adjustably connected as at 86 to the lower slide 33. These members 85 reciprocate through suitable bearings 87, and one of the members 85 and connections just described is provided at each corner of the lower slide 33 and below the same.

The gears 80 are rotated in any suitable manner preferably by means of pinion gears 88 mounted upon suitable shafts 89, and with these gears 88 the pinions 90 mesh, and the shaft 91 may be driven in any suitable manner, preferably by means of a pulley 92 over which a drive belt 93 passes and which belt is operated from any suitable source of power.

The pulley 92 is continuously operating and is adapted to be connected with and disconnected from the shaft 91 in any suitable manner, preferably in the same manner and by means of clutch devices similar to the clutches 40 and 67, that is by means of a clutch member 94 secured to the shaft 91 and adapted to be energized in a manner similar to the clutch devices 40 and 67.

A brake device may also be provided for stopping the operation of the shaft 90, and such brake device may comprise a pulley 95 with which a brake strap 96 co-operates, and which brake strap is preferably controlled or rendered active and inactive through the medium of an electro-responsive device 97 (see particularly Figure 10).

In order therefore to control the operation of the slides and to vary their order or sequence of operation, and to provide periods of dwell for the slides, it is only necessary to control the clutch devices and these clutch devices may be so controlled and operated that they can be set for any predetermined order or sequence of operation, either when the press is in operation or at rest.

When, however, they are set for one operation, the slides will operate in a definite fixed relation with respect to each other.

It is also possible that any one or more of the slides may be rendered inactive while the other or others remain active, and the lower or the outer slides may be kept idle and the press operated as a double slide press. This is accomplished by any suitable mechanism, but the preferred mechanism will now be described.

Each of the slides is provided with what might be termed a "limit switch" that is an automatically operating switch which is adapted to be set so as to cause the desired operation or movement of the respective slides, and as the construction and operation of each of the limit switches for each of the slides is the same, the specific description of one will apply equally as well to them all.

The numeral 98 designates a casing or housing (see particularly Figures 1, 4 and 7 to 13) of any desired size and configuration provided with a portion 99, in which is arranged suitable sight openings or windows 100.

A shaft 101 extends across the housing 98 and is journaled in suitable bearings 102, one end of the shaft extending beyond the housing and secured thereto for rotation therewith is a beveled gear 103 meshing with a beveled gear 103ª, secured to an upright shaft 104. This shaft 104 is journaled in suitable bearings 105, and to this shaft is secured another beveled gear 106, which in turn meshes with a beveled gear 107 secured to a shaft 108. Secured also to the shaft 108 is a gear 109 which in turn meshes with a gear 110 that is secured to a shaft 111. Secured also to the shaft 111 is a gear 112 which meshes with one of the gears 61 that is secured to one of the eccentrics of one of the slides so that as the slide is reciprocated, the shaft 101 through the medium of the gear connections just described, will be rotated.

The gear ratio of these parts is such that the shaft 101 will make one revolution for each complete stroke of its respective slide.

In the present exemplification of this invention, four cams 113 are secured to the shaft 101, and these cams are preferably in the form of comparatively large diameter steel discs, each provided with a cut away portion 114 in its periphery. The cams 113 are provided for the purpose of automatically opening and closing the various circuits which control the respective clutch devices to control the starting and stopping of the slides.

On the shaft 101 of the limit switch box 98 which controls the movement of the outer upper slide are arranged four of such cams and co-operating contact members which latter are adjustable from the outside of the switch box, in a manner to be described, and also two similar cams having co-operating contact members which are not adjustable from the outside of the switch box.

On the shaft 101 of the limit switch box 98 which controls the movement of the inner slide, four of such cams are provided which have co-operating contact members that are adjustable from the outside of the switch box, and two of such cams which have co-operating contact members that are not adjustable from the outside of the switch box.

On the shaft 101 of the limit switch box 98 which controls the lower slide, three of such cams are provided which have co-operating contact members that are adjustable from the outside of the switch box, and also two of such cams having cooperating contact members that are not adjustable from the outside of the switch box.

The contact members 115 which co-operate with the cams or discs 113 are adapted to co-operate with its contact bar 116 to which a conductor 117 is connected, the contact bar 116 being supported by means of a suitable bracket 118. This contact bar 116 remains stationary while the cams 113 being secured to the shaft 110, are rotatable with the shaft.

The contact 115 is movable and is adapted to be adjusted to a predetermined position. The adjustable contact members 115 are supported by an arm 119 which in turn is pivotally connected as at 120 to an arm 121, the latter being connected to a sleeve 122 rotatable about the shaft 101. A roller 123 is carried by the arm 119 and contacts with and moves over the periphery of the cam or disc 113. A plate 124 is supported by the arm 121 and also by means of an arm 125. The plate may be of any desired length and width and extends circumferentially about the cam 113 and is concentric with the axis of the shaft 101. The plate is arranged so as to be visible through the window 100, and on the face of the plate graduations 126 are arranged which indicate degrees, and connected to the contacts 115 to indicate the stopping positions of the slide.

A spring 127 is provided so as to hold the roller 123 against the periphery of the cam or disc 113 and to cause the roller to enter the cut away portion 114 of the disc or cam when the roller is in a position to enter such cut away portion. The spring 127 tends to force the roller 123 into the cut away portion 114 and thereby cause the contact 115 to move into engagement with the contact bar 116.

It will therefore be manifest that the movement of the slide will be controlled by the limit switch as the contact bar 116 is connected through suitable wiring or conductors and other suitable mechanisms to the respective clutch devices, the clutch devices being energized when the contact 115 is in engagement with the contact bar 116, and de-energized when the contact 115 is out of engagement with the contact bar 116.

Therefore, to control the operation of the slides it is only necessary to adjust the contact 115 so that the cam 113 will cause it to be moved into and out of contact with the contact bar 116. This is accomplished by rotatably adjusting the arm 119 and contact 115 about and with respect to the shaft 101.

For that purpose there is provided an operating shaft 128 mounted in suitable bearings 129 on a hanger 130, which latter may be loosely supported by the shaft 101. On the shaft 128 is provided a worm 131 which meshes with a worm gear 132 secured to the arms 119 and 121, the worm gear being connected to these parts in any suitable manner, such as by means of a pin 133.

The shaft 128 projects through a suitable bearing 134 in the wall of the housing 98 to extend therebeyond, and an operating knob or handle 135 is secured to the shaft 128 for rotating it.

Thus by rotating the shaft 128 by means of the handle 135, from the outside of the casing or housing 98, it will be manifest that the positioning of the contact 115 with respect to the cut away portion 114 of the cam or disc 133 may be controlled so as to effect the completing or the breaking of the circuit for controlling the clutch that in turn controls the slide, by causing or preventing the contact 115 to move into engagement or out of engagement with respect to the contact bar 116.

Obviously, these contacts are in circuit with relays which control the clutch circuits, and which relays and clutch circuits are well known in this art, but through the medium of these intermediate mechanisms the contacts 115 will thereby control the stopping and starting of the slides.

The position of the contacts is adjustable in every case so that the starting or stopping times of the slides are adjustable over a considerable distance.

The contact members 115$^a$ which are not adjustable from the outside of the limit switch box are supported by means of an arm 121$^a$ (see particularly Figure 8) anchored at one end by the shaft 101 and at its other end 121$^b$ as at 121$^c$, the arms 121$^a$ and 121$^b$ being preferably arranged at angles to each other to provide a pivot point 119$^a$ by which latter point the arm 119$^b$ is pivotally connected, a spring 119$^d$ serving to hold the roller 119$^e$ against the cam 113$^a$.

The contact 115$^a$ is a double contact and has a portion 115$^b$ which engages a contact member 115$^c$ which is concentric with and spaced from the contact member 116, the contact members 116 and 115$^c$ being spaced a sufficient distance so that when the contact 115$^a$ is in engagement with the contact member 116 it will be out of engagement with the contact member 115$^c$ and vice versa.

On the front, or any suitable portion of the limit switch box, is a dial 136 which is graduated to indicate the slide position in inches from the bottom of the stroke in the case of the inner and outer slides which are disposed above the bed of the press, and the top of the stroke in the case of the slide which is disposed below the bed of the press. Co-operating with the dial 136 is a pointer or indicator 137 which is secured to the shaft 101.

Thus it will be seen that inasmuch as there is provided in each of the limit switch boxes 98, cams or discs, and as each of these cams or discs 113 is provided with its individual co-operating mechanism which is adjustable from the outside of the limit switch box, it will be possible to set the mechanisms to provide any order or sequence of operation of the slides and to control and vary such order as well as control and vary the time of dwell of each of the slides and to render any one or more of the slides active while the remaining slide or slides remains or remain inactive.

A starting button 145 and a stopping button 146 constitute the ordinary form of switch and are connected to the source of supply of current for controlling the same.

The brake devices are normally active, and the press is set into operation by pressing the starting button 145 and this will immediately, in a manner well known in this art, energize the brake magnets to release the brakes and the clutch devices will be rendered active. That is, when the cut away portion 114 of the respective discs or cams 113 is moved by the operation of the shaft 101 to a position that the contact 115 will enter the cutaway portion 114 to engage the contact bar 116, the circuit will be completed, rendering the clutch device active, and this will maintain the clutch device 67 active so long as the contact 115 remains in engagement with the contact bar 116. When, however, the cam or disc 113 moves to a position as to disengage the contacts 115—116, the circuit through the clutch device 67 will be broken and that particular slide will be arrested in its movement.

As the shaft 101 of the limit switch rotates, it also rotates the other cams or discs 113 in the limit switch box and this will cause the remaining contacts 115—116 as well as the contacts 115$^a$ and 115ᵇ to be moved into and out of engagement with respect to each other, so as to render the other clutch device active or inactive at predetermined times in the cycle of operation of the press, according to the position into which the cut away portion of the cam or disc has been moved by the adjusting knob 135.

By adjusting the respective contacts 115 the relative movements, the order and sequence of movement and the length of dwell of the various slides in the cycle of operation of the press may be controlled.

The limit switch control devices of all of the slides are connected to the clutches in a manner similar to that which has just been described with reference to the outer slide mechanism.

Similarly, a conductor 153 leads from the relay panel box to the clutch device 94 for the lower slide, and the conductor 154 leads from the clutch device back to the panel 140.

Thus it will be seen that by a manipulation or setting of the contacts 115 with respect to the various cams or discs 113, any order or sequence may be obtained in the movement of the slides.

There is provided what is known as an "inch master" switch device 155, by means of which the slides may be inched or adjusted to obtain the proper positioning thereof without the necessity of setting into operation all of the other parts, and an operation master switch 156 is also included in the line.

The "inch master" switch device 155 is used only in inching the various slides, but in the ordinary operation of the press, it has no function.

The operating master switch device is set when it is desired to operate the mechanism and the press is operated by setting the master switch for the operation desired, after which the starting button 145 is actuated.

With the press thus started, the limit switches then open and close the clutch circuits according to the manner in which they have been set, so that the desired operation of the slides will be obtained.

In Figures 21, 22 and 23 there is diagrammatically illustrated the limit switch boxes and the setting buttons or knobs 135 for the contact members 115 with relation to the respective cams or discs 113.

Indicated on these respective views is the order or sequence in which the cam devices 113 control the various contacts so as to produce the operations of the slides, as indicated by the cyclographs shown in Figures 11 to 16.

In order to understand the function of the various cam operated contacts, reference is had to Figures 21, 22 and 23 and to Figures 15 to 20.

In the cyclographs, the horizontal portions indicate the dwell of the different slides which, as before stated, is controlled or varied by the position of the respective cams or discs 113.

In tracing the circuits in the wiring diagram the parts referred to and designated by reference letters are as follows:

LS, limit switch
C, contactors
LVR, main contactors for the circuits
CR, coils for operating contactors in limit switch circuits
OL, overload relay
VI$_a$, contactors The following elements are common to each of the three magnetic clutch and brake units and their function to render active, hold active and render inactive each of the respective three units for operations 1 to 6 (Figures 15 to 20 of the drawings) inclusive is the same. These common elements are connected to the "inch master switch" to which will be sent the variable timed impulses whose circuits are completed through these common elements. (See Figure 28 of the drawings).

I$_1$—normally open contactor
I —coil for operating I$_1$ and I$_2$ contactors
III$_1$—normally open contactor
III —coil for operating III$_1$ contactor
IV$_1$—normally closed contactor
IV$_2$—normally open contactor
IV —coil for operating IV$_1$ and IV$_2$ contactors
VI$_1$—normally open contactor (not shown, Fig 28, see Fig. 14)
VI —coil for operating VI$_1$ contactor
V$_1$—normally closed contactor
V$_2$—normally closed contactor
V —coil for operating V$_1$ and V$_2$ contactors
II$_2$—normally open contactor Resistors R$_1$V and AB are for controlling line line voltage across magnets.

The function of the above listed common elements in rendering the particular slide drive active is as follows: (refer to Figure 28) Current will flow from line L$_1$ through the variable timing devices (see Fig. 14) through line 8 to "inch master switch," through contactors V$_2$—V$_1$, resistor AB completing a circuit through coils I, II, III and IV to line L$_2$, thereby energizing the coils. Coils I, II, III and IV close respectively contactors I$_1$, I$_2$, II$_1$, III$_1$ and IV$_2$ and open contactor IV$_1$. This will close the circuit through the brake magnet to release the brake with full line current through contactors I$_1$ and III$_1$. At the same time current will flow from L$_1$ through contactor I$_1$, resistor R, contactor IV$_2$, coil VI$_1$, clutch magnet, contactor II$_2$ and coil V to line L$_2$, thereby energizing clutch magnet and rendering clutch and drive active.

In addition to energizing the clutch magnet, the coils VI and V will be energized. Coil V will then open the normally closed contactors V$_1$ and V$_2$ breaking the circuit through coils III and IV which in turn will break the flow of current through contactor III$_1$. Also break the flow of current through contactor IV$_2$ and establish a circuit through the contactor IV$_1$ thereby placing the brake magnet in series with the clutch magnet. Magnets will then be maintained active at a reduced voltage and current therefore less heating of magnets. This is possible since the magnets are at their minimum gap or closed position. The coils I and II are held active by circuits from L$_2$ through resistor AB, inch master contact 8, through contactor I$_2$ and contact 5, contacts 8 and 5 will maintain holding circuits as described above until they are interrupted by the proper setting of cams in the active limit switch boxes.

Coil VI when energized as described above will close contactor VI$_1$ (Fig. 14) in the limit switch circuit to interlock the starting circuit of the next slide to be started at the bottom of its travel from the active slide and therefore complete its cycle.

The above described sequence of operation of the elements which are common to all of the clutches and brakes will take place as timed by the set up cycle of the press operation with the exception of the "inch operation" which will be later described in connection with Figure 27 of the drawings.

In performing operation #1, and referring to Figure 15, and in order to perform this operation, the start button 145 (see Figures 4 and 14) is closed.

This will close the main line circuit through coil $LVR_1$ closing contactors $LVR_1$, $LVR_2$ and $LVR_3$. This main line circuit is provided with an overload relay (OL Figure 14) to render press control and also press inactive should a short circuit or overload develop in any of the operating circuits. Also should the main power line fail while the press is running, the press will stop as contactors $LVR_2$ open. The master switch 156 (Figure 4) being set for operation #1, (Figure 15), the "inch master switch" 155 (Figure 4) being set on "long operation," the press is then started by pressing the "run button" 145a.

This in turn closes circuit through coils 1CR and 2CR which in turn closes contactor $1CR_1$ and $2CR_1$. Current then flows through master switch contacts 8a and 51 then through normally closed limit switch 1LS, in outer slide limit switch box through contacts 52 and 8, thence through inch master switch contacts on long position (i. e. starter button being held closed until slide reaches bottom of stroke) through 8 and 1, then through normally closed contactor $5A_1$, energizing coil 1A and 2A. Current will also flow from contactor 8 and 2, inch master switch through normally closed contactor $5a_2$ energizing contactor coils 3a and 4a. The coils 1a, 2a, 3a, and 4a close respectively contactors $1a_1$, $1a_2$ and $2a_1$, $3a_1$, $4a_1$ and $4a_2$. This will close the circuit through the brake magnet to release the brake and also energize the clutch magnet to render the clutch active.

This will render the outer slide clutch 67 active and start the outer slide 27 in its downward stroke. At the same time the cams 113 in the outer slide limit switch box (Figure 21) will be caused to rotate.

On the outer slides downward stroke, limit switch 2LS in the outer slide limit switch box closes, causing current to flow through normally closed limit switch 12LS, through contact 17, contact 58 of master switch, then through inner slide limit switch 4LS, through contact 59, contact 63 of master switch, through inner slide limit switch 23LS, through contactor $6a_1$, which is a normally open contactor and was closed by coil 6a, which in turn was energized when the clutch and brake circuit was closed, then back through 2LS, through normally open contactor $2CR_1$ which was closed by coil 2CR motor interlock circuit 18, coil 2CR being energized when run buttons are closed at start of operation of press. From $2CR_1$ the current will flow through contact 61 and contact 28 of the master switch, through contact 28 and 21 of the inch master switch, then through normally closed contactor $5b_1$, through coils 1b and 2b. Current also flows from contact 28 to contact 22 of the inch master switch through normally closed $5b_2$ energizing coils 3b and 4b. The coils 1b, 2b, 3b and 4b close their respective circuits through contactors $1b_1$, $1b_2$, $2b_1$ and $3b_1$.

At this time the normally closed contactor $4b_1$ will open and $4b_2$ will close. This will energize the brake magnet of the inner slide to release the brake and energize the clutch magnet of the inner slide to render it active, and the inner slide will then start to move downward.

When the outer slide reaches the limit of its downward movement, it will dwell, as the circuit through the clutch and brake magnets will be opened by limit switch 1LS in outer slide limit switch box to release the clutch and apply the brake. The cams in the outer slide limit switch box will also be caused to dwell.

The circuit through the outer slide contactor coils 1a, 2a, 3a, and 4a is broken by the limit switch 1LS.

The inner slide on its downward movement will cause the cams in the inner slide limit switch box 98 to be rotated. The limit switch 5LS will then at the proper time make contact to close the circuit; the current will then flow through limit switch 12LS, through contact 17, contact 67 of the master switch 156, and through switch 5LS, through contact 38, contact 31 of the inch master switch, through normally closed contact $5c_1$, through coils 1c and 2c, thereby energizing the coils. Current will also flow from contact 38 of the inch master switch, to contact 32 of the same switch, through contactor $5c_2$ and then through coils 3c and 4c also energizing the coils.

The coils 1c, 2c, 3c and 4c will close their respective circuits through contactors $1c_1$, $1c_2$, $2c_1$ and $3c_1$; the normally closed contactor $4c_1$ will open and $4c_2$ will close. This will energize the brake magnet of the lower slide and release the brake and energize the clutch magnet of the lower slide drive to raise the lower slide. At the same time the cams in the lower slide limit switch box will be rotated.

The inner slide will continue its stroke and when it reaches the bottom of its stroke it will be caused to dwell by limit switch 4LS which at this point will break the circuit through the contactor coils 1b, 2b, 3b and 4b thereby interrupting the clutch and brake magnet circuit of the inner slide previously established through the contactors $1b_1$, $1b_2$, $2b_1$, $2b_2$, $3b_1$ and $4b_2$.

At this time the limit switch cams of both the inner and outer slides will be at rest.

In the operation thus described, the inner slide will not start in its upward movement until after the lower slide reaches the limit of its operative stroke and then starts to return.

On the downward movement of the lower slide limit switch 8LS in the lower slide limit switch box will make contact. Current will then flow through closed limit switch 12LS through master switch contacts 17 and 62 through limit switch 8LS through inch master switch contact 28, through contact 21, through normally closed contactor $5b_1$, through coils 1b and 2b thereby energizing the coils. Current will also flow from contact 28 of the inch master switch through contact 22, through contactor $5b_2$ to coil 3b and 4b. The coils 1b, 2b, 3b and 4b will render clutch and brake circuit active as before described through their respective contactors.

The inner slide operating mechanism as above described will then become active to return or raise the inner slide.

After the inner slide has traveled a short distance in its raising movement, the outer slide starts to raise and this is accomplished as follows:

Limit switch 24LS of the inner slide limit switch box will then make contact causing current to flow through limit switch 12LS or contactor $6c_1$ through contacts 17 and 53 of the master switch, then through contactor $6b_1$ or limit switch 101LS through limit switch 24LS, to contacts 55 and 8 of the master switch, then through contacts 8 and 1 of the inch master switch and then through normally closed contactor 5a1 through coils 1a and 2a, energizing the coils. Current also flows from contact 8 through contact 2 of the inch master switch, then through normally closed contactor 5a2 through coils 3a and 4a to energize them. The coils 1a, 2a, 3a and 4a will then render active the outer slide clutch and brake circuit through the respective magnets heretofore described.

Before the inner and outer slides reach the top of their stroke the lower slide will be stopped as follows:

Limit switch 7LS will open the circuit which was maintained through limit switch 12LS or contactor 6c1, contacts 17 and 66 of master switch, through limit switch 7LS, contactor 1c2, contacts 31 and 33 through resistance GH through coils 1c and 2c thereby de-energizing the clutch and brake magnet causing the lower slide to be stopped.

The inner slide is stopped at the upper end of its stroke as follows:

Limit switch 6LS of the inner slide limit switch box will break the circuit maintained through limit switch 12LS, contacts 17 and 68 of the master switch through switch 6LS, contact 25, contactor 1b2, contacts 21 and 23 of inch master switch through resistor CD through coils 1b and 2b, thereby de-energizing coils 1b and 2b to render the brake and clutch magnet circuit inactive stopping the inner slide.

The outer slide is stopped at the limit of its cycle or upper stroke as follows:

Limit switch 3LS in the outer slide limit switch box breaks the circuit maintained through contactor 1CR1, contact 8a and contact 51 of master switch through limit switch 1LS, contacts 52 and 55 of master switch, through limit switch 24LS, through limit switch 3LS, through contact 5, through contactor 1a2, through contacts 1 and 3 of inch master switch, through resistor AB, through coils 1a and 2a. This renders the circuit inactive and the clutch and brake magnet will be de-energized.

The other cycles of operation of the press to produce the results shown in Figures 16 to 20, of the drawings are accomplished in the same manner, except that the contacts which co-operate with the cams in the respective limit switch boxes must be respectively adjusted or set by the operating handles 135 to accomplish the desired cycles and the sequence of operation of the slides. The master switch must also be correspondingly adjusted or set.

*Operation #2*

To perform operation #2, Figure 16, the master switch being set for operation #2, and the inch master switch set on long operation, when the run button is depressed, as described in operation #1, the following will take place: Current will flow through contactor ICR1, contacts 8A and 58, then through normally closed limit switch in inner slide limit switch box, through contacts 59 and 28, to contact 28 of the inch master switch. This will render inner slide clutch and brake magnets active as described in Figure 28 and start inner slide in its downward movement and will also cause the cams in the inner slide limit switch box to rotate. As the inner slide nears the bottom of its downward stroke, limit switch 5LS in the inner slide limit switch box makes contact causing current to flow from line L1 through contactor ICR1, contacts 8A, 67, through limit switch 5LS and then to contact 28 of the inch master switch. This will then render lower slide clutch and brake magnets active as described in Figure 28, starting lower slide in its upward movement. Lower slide limit switch cams will then rotate. When the inner slide reaches the bottom of its stroke, limit switch 4LS in the inner slide limit switch box opens and breaks the holding circuit maintained through contacts 8A, 58, limit switch 4LS, 59 and 28 of the master switch, through to 28 of the inch master switch. This will cause inner slide clutch and brake magnets to be de-energized as described in Figure 28; the inner slide will then dwell, and its limit switch cams will be stationary. The lower slide will continue to the top of its stroke and start down. As it nears the bottom of its downward travel, limit switch 8LS in the lower slide limit switch box makes contact, causing a circuit to be made through contacts 8A and 62 of the master switch through limit switch 8LS to contact 28 of the inch master switch, thereby causing the inner slide clutch and brake magnets to be energized as described in Figure 28. This will start the inner slide on its upward movement and also cause the cams in the inner slide limit switch box to rotate. As the lower slide reaches the limit of its downward movement, limit switch 7LS of the lower slide limit switch box will break the circuit maintained through contacts 8A and 66 of the master switch, through limit switch 7LS, to contact 35 of the inch master switch, thereby causing the lower slide clutch and brake magnets to be de-energized thus stopping the lower slide and the cams in the lower slide limit switch box. When the inner slide reaches the top of its stroke, limit switch 6LS of the inner slide limit switch box will break the circuit maintained through contacts 8A and 68 of the master switch through limit switch 6LS to contact 25 of the inch master switch rendering the inner slide clutch and brake magnets inactive as described in Figure 28. This will bring the inner slide and the cams in the inner slide limit switch box to rest, thus completing the cycle of operation.

*Operation #3*

To perform operation #3, Figure 17, the master switch being set for operation #3 and the inch master switch set on long operation, when the run button is depressed as described in operation #1, the following will take place: Current will flow through contactor ICR1, contacts 8A and 51 of the master switch then through normally closed limit switch 1LS in the outer slide limit switch box, through contacts 52 and 8 then to contact 8 of the inch master switch. This will cause outer slide clutch and brake magnets to be energized as described in Figure 28, resulting in the downward movement of the outer slide and also rotation of the outer slide limit switch cams. Shortly after the outer slide is started on its downward stroke, limit switch 2LS in the outer slide limit switch box makes contact, causing current to flow through contacts, limit switch 12LS, contacts 17, 63, through contactor 6A, through limit switch 2LS, through contactor 2CR1, through contacts 61 and 28 of the master switch, to contact 28 of the inch master switch. This will render inner slide clutch and brake magnets active as described in Figure 28, causing the inner slide to start on its downward movement, and the inner slide cams to rotate. When the outer slide reaches the bottom of its stroke, limit switch 1LS opens and breaks the circuit maintained through contacts 8A, 51, 1LS, 52 and 8 of the master switch, through contact 8 of the inch master switch, causing the outer slide clutch and brake magnets to be de-energized as described in Figure 28, and also stopping the outer slide and its limit switch cams. While the outer slide dwells, the inner slide will continue in its downward movement to the bottom of its stroke and start upward. At a predetermined point in its upward movement, limit switch 101LS will close in the inner slide limit switch box, causing current to flow through limit switch 12LS, contacts 17 and 53, limit switch 101LS through limit switch 24LS, through contacts 55 and 8 of the master panel to contact 8 of the inch master panel, thereby causing outer slide clutch and brake to become active as described in Figure 28, and start the outer slide on its up stroke; also causing outer slide limit switch cams to rotate. The inner slide is stopped at the top of its stroke by limit switch 23LS which breaks the holding circuit maintained through limit switch 12LS, contact 17, contact 63, limit switch 23LS, contact VIa1, to contact 25 of the inch master switch, thereby de-energizing clutch and brake magnets of the inner slide as described in Figure 28, causing the inner slide to come to rest and also its limit switch cams. When the outer slide reaches the top of its stroke, limit switch 3LS in the outer slide limit switch box breaks the circuit maintained through limit switch 12LS, contacts 17 and 53 of the master switch, through limit switch 101LS, through limit switch 3LS, to contact 5 of the inch master switch causing the clutch and brake magnets of the outer slide to be de-energized as described in Figure 28, thus completing the cycle of operation.

Operation #4

To perform operation #4, Figure 18, with the master switch set for operation #4 and the inch master switch set on long operation when the run button is depressed, the following will take place. The current will flow through contactor ICR1, contacts 8A and 51 of the master switch, then through limit switch 1LS1 and the outer slide limit switch box, then through contacts 52 and 8 of the master switch, through contact 8 of the inch master switch; this will render the outer slide clutch and brake magnets active as described in Figure 28, resulting in the downward movement of the outer slide and also rotation of the outer slide limit switch cams. As the outer slide nears the bottom of its stroke, limit switch 31LS in the outer slide limit switch box makes contact causing current to flow through limit switch 12LS, contacts 17 and 68 of the master switch, through limit switch 31LS to contact 38 of the inch master switch; this will cause the lower slide clutch and brake magnets to be energized as described in Figure 28, starting the lower slide on its up stroke inner slide limit switch cams will also be made active. When the outer slide reaches the bottom of its stroke, limit switch 1LS opens and breaks the circuit maintained through contacts AA51, 1LS52 and 8 of the master switch through contact 8 of the inch master switch rendering the outer slide clutch and brake inactive, as described in Figure 28, thus causing the outer slide and its limit switch cams to dwell. The lower slide will continue to the top of its stroke and start its downward movement shortly after the lower slide starts on its down stroke. Limit switch 34LS in the lower slide limit switch box makes contact causing current to flow through limit switch 12LS or contactor VIc1, contact 17—64 of the master switch through limit switch 34LS, through contact 28 of the inch master switch energizing the inner slide clutch and brake magnets as described in Figure 28. This will start the inner slide on its down stroke also causing the inner slide limit switch cams to rotate. When the lower slide reaches the limit of its downward movement, limit switch 7LS in the lower slide limit switch box breaks the circuit maintained through limit switch 12LS, contactor VIc1, contact 17 and 66 of the master switch through limit switch 7LS and contact 35 of the inch master switch, thus rendering the lower slide clutch and brake magnets inactive as described in Figure 28; this will stop the lower slide and also the lower slide limit switch cams. The inner slide will continue to the bottom of its stroke and start on its upward movement. At a predetermined point of the upward movement of the inner slide, limit switch 24LS in the inner slide limit switch box makes contact causing current to flow through limit switch 12LS through contacts 17 and 53, VIb1 or limit switch 101LS through limit switch 24LS contacts 55 and 8 of the master switch and then through contact 8 of the inch master switch, thereby energizing the outer slide clutch and brake magnets causing the outer slide to start on its up stroke also causing the outer slide cams to rotate as described in Figure 14. When the inner slide reaches the top of its stroke, limit switch 23LS breaks the circuit maintained through limit switch 12LS, contact 17, contact 63, limit switch 23LS, contact VIa1 or limit switch 100LS, through contact 25 of the inch master switch, thereby de-energizing the inner slide clutch and brake magnets as described in Figure 28, causing the inner slide to come to rest, also the cams in its limit switch box will become inactive. When the outer slide reaches the top of its stroke, limit switch 3LS in the outer slide limit switch box breaks the circuit maintained through limit switch 12LS, contacts 17 and 53 of the master switch, through limit switch 101LS, through limit switch 3LS, to contact 5 of the inch master switch, causing the clutch and brake magnets of the outer slide to be de-energized as described in Figure 28 thus completing the cycle of operation.

Operation #5

To perform operation #5, Figure 19, the master switch being set for operation #5 and the inch master switch beting set on long operation when the run button is depressed as described in operation #1, the following will take place. Current will flow through contactor ICR1, contacts 8A and 58 of the master switch, through limit switch 4LS through contacts 59 and 28 of the master switch, through contact 28 of the inch master switch, thereby energizing the inner slide clutch and brake magnets, as described in Figure 28, causing the inner slide limit switch cams to rotate and the inner slide to start on its down stroke; as the inner slide nears the bottom of its stroke, limit switch 41LS makes contact closing a circuit through contacts 8A and 56 of the master panel through limit switch 41LS, through contact 8 of the inch master panel, thus rendering active the outer slide clutch and brake magnets as described in Figure 28, thus starting the outer slide on its down stroke and also causing the outer slide limit switch cams to rotate. When the inner slide reaches the bottom of its stroke, limit switch 4LS will break the circuit maintained through contact 8A, 58, limit switch 4LS, contact 59, 28 of the master panel through contact 28 of the inch master switch, thereby de-energizing inner slide clutch and brake magnets as described in Figure 28. This will cause the inner slide to dwell together with its limit switch cams. The outer slide wall will continue to the bottom of its stroke and will start on its upward movement. Near the top of its stroke limit switch 44LS in the outer slide limit switch box will make contact closing the circuit through limit 12LS, contacts 17 and 65 of the master switch, through limit switch 44LS and contact 28 of the inch master switch. This will render the inner slide clutch and brake magnets active as described in Figure 28, starting the inner slide on its up stroke, also causing the inner slide limit switch cams to rotate. When the outer slide reaches the top of its stroke, limit switches 43LS of the outer slide limit switch box, break the circuit maintained through contacts 8A and 57 of the master switch through 43LS, through contact 5 of the inch master switch. This will cause the outer slide clutch and brake magnets to be de-energized, as described in Figure 28, and stop the outer slide and also the cams in its limit switch box. As the inner slide reaches the top of its travel, limit switch 6LS in the inner slide limit switch box will break the circuit maintained through limit switch 12LS, contacts 17 and 60 of the master switch through limit switch 6LS, through contact 25 of the inch master switch. This will render the inner slide clutch and brake magnets inactive as described in Figure 28, thus bringing the inner slide to rest and also its cams in its limit switch box and operation #5 will then be complete.

*Operation #6*

To perform operation #6, Figure 20, the master switch being set for operation #6 and the inch master switch set on long operation, when the run button is depressed as described in operation #1, the following will take place. Current will flow through contactor ICR₁, contacts 8A and 58 of the master switch, through limit switch 4LS, through contacts 59 and 28 of the master switch through contact 28 of the inch master switch, thereby energizing the inner slide clutch and brake magnets, as described in Figure 28, causing the inner slide limit switch cams to rotate and the inner slide to start on its down stroke. When the inner slide nears the bottom of its stroke, limit switch 31LS in the outer slide box makes contact causing current to flow through limit switch 12LS, contact 17 and 68 of the master switch, through limit switch 31LS and then through contact 38 of the inch master switch, causing the clutch and brake magnets of the lower slide drive to be energized, as described in Figure 28. This will then start the lower slide on its up stroke and render the lower slide limit switch cams active.

Figure 28:
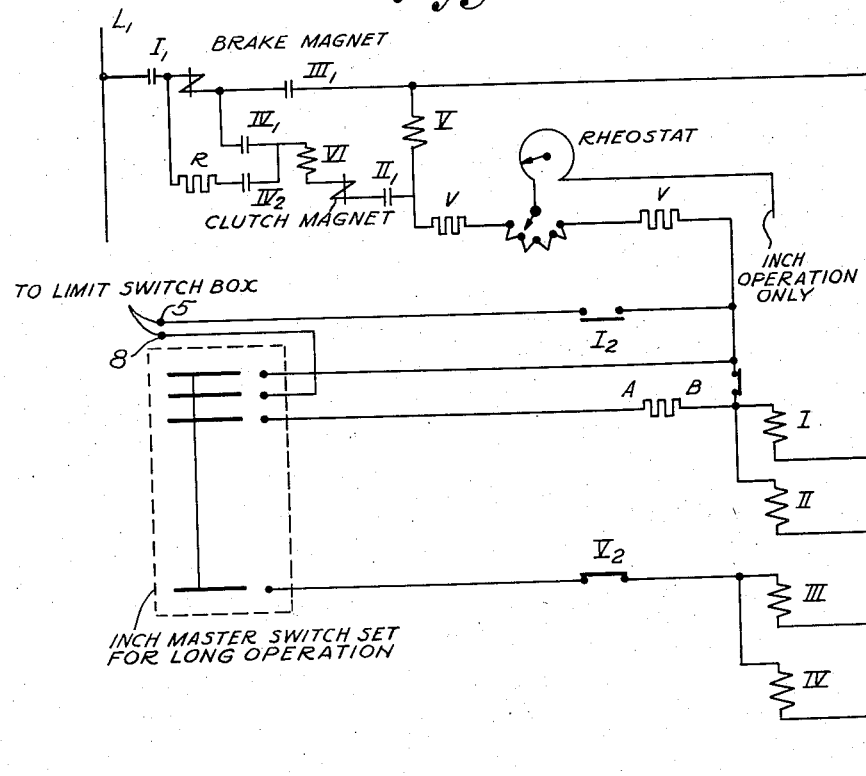

As the inner slide reaches the bottom of its downward travel the limit switch 4LS in the inner slide limit switch box will break the circuit maintained through contacts 8A, 58 and limit switch 4LS, contact 59 and 28 of the master switch and contact 28 of the inch master switch, thereby de-energizing the clutch and brake magnets of the inner slide drive as described in Figure 28, causing the inner slide and its limit switch cams to dwell.

When the outer slide reaches the limit of its down stroke, the limit switch ILS of the outer slide limit switch box will break the circuit maintained through contacts 8A, 51, limit switch ILS, contacts 52 and 5 of the master switch and then through contact 5 of the inch master switch. This will cause the outer slide clutch and brake magnets to be de-energized as described in Figure 28. The outer slide and its limit switch cams will then dwell.

The lower slide will continue to the top of its stroke and then start its downward travel. Just before the lower slide reaches the limit of its downward travel, limit switch 9LS in the lower slide limit switch box will make contact closing a circuit through limit switch 12LS or contactor VIc₁, through contact 17 and 54 of the master switch, through limit switch 9LS, through contact 8 of the inch master switch, thereby rendering the outer slide clutch and brake magnets active as described in Figure 28. This will cause the outer slide to start on its up stroke and also cause the outer slide limit switch cams to rotate. As the lower slide further continues its downward travel, limit switch 8LS in the lower slide limit switch box makes contact closing a circuit through limit switch 12LS or contactor VIc₁ through contacts 17 and 62 of the master switch, through limit switch 8LS and through contact 28 of the inch master switch energizing the inner slide clutch and brake magnets as described in Figure 28. This will cause the inner slide to start on its up stroke and also rotate the inner slide limit switch cams.

When the lower slide reaches the bottom of its stroke, limit switch 7LS in the lower slide limit switch box will break the circuit maintained through limit switch 12LS or contactor VIc₁, contact 17 and 66 of the master switch through limit switch 7LS through contact 35 of the inch master switch, thereby de-energizing the lower slide clutch and brake magnets as described in Figure 28. This will bring lower slide and its limit switch cams to rest.

Limit switch 3LS in the outer slide limit switch box will act to stop the outer slide at the top of its stroke by breaking the circuit maintained through limit switch 12LS or contactor VIc₁, contact 17 and 69 of the master switch through limit switch 3LS and then through contact 5 of the inch master switch, causing the outer slide clutch and brake magnets to be de-energized as described in Figure 28. The outer slide and its limit switch cams will then be rendered inactive. When the inner slide reaches the top of its stroke, limit switch 6LS in the inner slide limit switch box will break the circuit maintained through limit switch 12LS or contactor VIc₁, contacts 17 and 60 of the master switch, through limit switch 6LS and then through contact 25 of the inch master switch, causing the inner slide clutch and brake magnets to be de-energized as described in Figure 28. The inner slide and its limit switch cams will then be rendered inactive. This completes the cycle of operation #6.

It is also obvious that the various contacts 116 are so wired or electrically connected with the various clutches to produce the operations or conditions as illustrated by the slogans in Figures 21, 22 and 23 and also diagrammatically in Figures 15 to 20 inclusive.

With this improved construction it will be manifest that there is disclosed a press provided with three slides, to wit: an outer slide and an inner slide, operating above the bed of the press, and a lower slide which operates below the bed of the press, and each is provided with its own independent drive.

The clutch control devices can be set for any one of the six sequences of slide operation which are disclosed cyclographically in Figures 15 to 20. When the contacts which co-operate with the cams 113 are set for one operation, the slides operate in a definite fixed relation to each other.

In addition to the triple slide and variable operations, it is also possible to maintain the lower, or the outer slide idle and the press may then be operated as a double slide press.

It is also possible, as before stated, to render any one or more of the slides inactive while the other slides remain active, and any combination or arrangement in the operation of the slides may be provided, and the periods of dwell may be established or varied according to the will of the operator and the nature of the work being performed.

In order to render any one or more of the slides inactive, the operating master switch device 156 is employed and this operating master switch is of an ordinary and usual form for controlling the operation of the clutch devices independently of the limit switch controls and consists merely of any form of switch such as a knife switch of usual construction.

The "inch master" switch device 155 is employed when it is desired to inch the slides so as to properly position them at the start of the operation and this "inch master" control is of the ordinary drum type controller and well known construction and is only used in the inching operation. It is only used in changing the control circuits from "inch" to "run" or "long" setting.

In order that the operation of the "inch master" switch may be fully understood, there is shown diagrammatically in Figure 23 of the drawings the mechanism for controlling the clutch device 94, that in turn controls the operation of the lower slide 33.

The "inch master" switch consists essentially of a housing in which there is provided a shaft A rotatable by a handle B, and the shaft carries a series of fingers or contact members C, which latter are movable into and out of engagement with contact members D—E. The contacts D are respectively connected with the conductors 149—150 that lead from the source of supply of current 138—139, by means of conductors 149a and 150a. The contacts E—E are connected with the relay device 140a by means of conductors 155a and 155b, and the conductors 153—154 leading from the clutch device 94 are connected to the contacts 153a—154a, so that when the relay 140a is energized, the contacts 153a and 154a will close the circuit through the conductors 154—154 and the clutch device 94, to control the latter.

A push button or switch F is provided for manually controlling the relay 140a. This push button is arranged in a line formed by a conductor 138a leading from the supply line 138, through the button or switch device F, conductor 138b, through the relay device 140a and back to the line 139 through a conductor 139a, so that by operating the button F, the relay 140a will be energized and de-energized and the clutch 94 will be alternately rendered active and inactive, thereby causing the slide 33 to be "inched" into position. One relay device 140a and one push button F, is only necessary, as the relay device is connected to the other clutch devices in a similar manner. The "inch master" 155 is provided with contacts similar to the contacts D and E, which are respectively connected to the respective clutch devices, and the shaft A carries additional fingers or contact members to respectively co-operate with the contacts D—E.

Therefore, the clutch devices may be selectively controlled by setting the fingers or contacts C to engage the desired contacts D—E, as is usual in devices of this character. The operation of the clutch 94 to control the lower slide 33, and "inch" the same into position will be understood by referring to Figure 23 of the drawings.

The "inch master" 155 is set to control the desired slide through its respective clutch device, by rotating the shaft A by the handle B to cause the contact members or fingers C to engage the respective contacts D—E.

Then, as soon as the push button or switch F is actuated or vibrated, the clutch device will be alternately rendered active and inactive.

When the button F is pushed to close the circuit, after the contacts C of the "inch master" 155 have been set, the circuit will be as follows. From the line or supply conductor 138, through the conductor 150, conductor 150a, contact D, contact member C, contact E, conductor 155a, relay device 140a, contact 154a, conductor 154, clutch device 94, out through conductor 153, contact 153a, relay device 140a, conductor 155b, contact E, contact member C, contact D, conductor 149a back to line 139.

At the same time current will flow from the supply line or conductor 138, through the conductor 138a, push button F, conductor 138b, relay device 140a, conductor 139a and back to the line 139.

Thus it will be seen that by pulsating the button F, the slide may be "inched" towards the work.

Figure 27:
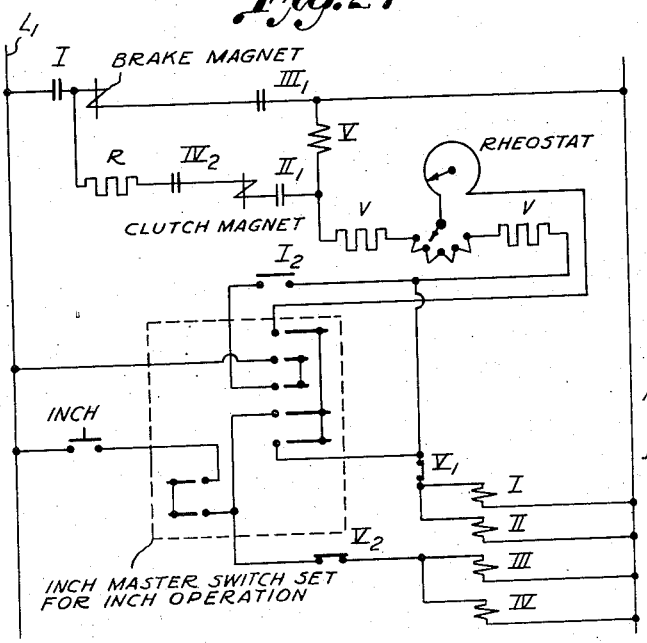

For the "inching" operation reference may be had to Figure 27. With the "inch master switch" being set, the current will be as follows (see also Figure 14): When inch button 145c, Figure 4, is pressed, current will flow from line L₁ through inch button 145c through inch master switch contact, through normally closed contactor V₂, coils III and IV to line L₂ thereby energizing the coils. Current will also flow through normally closed contactor V₁ through coils I and II to line L₂ energizing these coils. Coils I, II, III and IV will then close their respective contactors I₁, I₂, II₁ and III₁, IV₂. This will cause current to flow directly through brake magnet, thereby releasing brake. At the same time current will flow through contactors I¹, resistor R, contactor IV₂, through clutch magnet, through contactor II₁', and then through coil V. This will render the clutch magnet active, thus engaging the clutch.

At the same time coil V being active will open contactor V₁ and V₂, thereby de-energizing coils I, II, III and IV and their respective contactors I₁, II₁, III₁ and IV₂ breaking the circuit through the clutch and brake, rendering the clutch and brake magnets active, thus momentarily stopping the movement of the slide until the contactors V₁ and V₂ close, being released by coil V which is de-energized along with the clutch and brake. The circuit through the inch button and inch master switch and through coils I, II, III and IV is again established. This operation will be successively repeated as long as the inch button is held depressed. The timing of the interruptions is adjusted through the rheostat provided for that purpose.

The indicating chart 124 in the limit switch boxes, visible through the sight opening 100, indicates in degrees the position of the operating parts as well as the slide, and the dial 136 and indicator 137 on the outside of the limit switch boxes indicate the position in inches of the slide from the end of its stroke or from the point of its operation upon the work.

It will therefore be manifest that the operator can at any time determine the position of the slide and of the operating parts by an inspection of these indicating mechanisms.

Obviously the various conduits and conductors may be encased in a suitable housing or piping 159.

In order to insure that the bottom of the outer slide 27 will, in operation, never be less than a set predetermined distance below the bottom of the inner slide 30, in order to prevent the inner slide from striking the blank holder ring, which is attached to the bottom of the outer slide, or prevent the parts from striking each other, which would cause damage thereto, there is provided a switch device embodying an arm 160, preferably carried by the inner slide 30 (see Figures 1, 24 and 25). This switch arm 160 is in a normally closed circuit in which the clutch for the slide is included. This circuit may lead from the conductor 141 by means of the conductor 161, condenser 162, to the relay on the panel 140, and which relay is in the clutch circuit, thence through the conductor 163, through the normally closed switch member 160, conductor 164, to the conductor 142.

Within the path of movement of the switch arm 160 is arranged an adjustably mounted trip arm or member 165, so positioned, that when the switch arm 160 engages the trip 165, the former will be shifted to open the clutch circuit and the brakes will be applied, thereby stopping the slides. This will occur automatically every time that the switch arm 160 engages and is shifted by the trip member 165.

However, when it is desired that the inner slide shall move entirely through or beyond the outer slide, so that the die or tool may be attached to the inner slide, this is accomplished by "by-passing" or shunting the switch which includes the switch arm 160.

To that end, a by-pass or shunt circuit is provided and preferably comprises a conductor 166 leading from the conductor 144 around the switch 160, and in which shunt or by-pass circuit is included a manually controllable switch 167, preferably in the form of a push button. This shunt or by-pass circuit, however, is only operable when the switch or button 167 is manually held closed, and is only employed during the die setting and resetting of the slides.

It is desirable that the inner slide shall pass completely through the outer slide for quick die setting, so that the punch can be attached to the inner slide without interfering with the outer slide. This may be accomplished by pressing the button or operating the switch 167 to shunt or by-pass the circuit around the switch 167 to shunt or by-pass the circuit around the switch 160. Thereafter, the inner slide may be "inched" to the top position with respect to the outer slide, and the blank holder may be attached to the outer slide.

If the inner slide 30 is traveling downwardly while the outer slide 27 is stationary, and the switch 167 is open, while the switch 160 is closed, when the bottom of the inner slide 30 is at a predetermined distance above the bottom of the outer slide 27, say nine inches, the switch arm 160 will strike or engage the trip member 165 on the outer slide 27 and will be shifted thereby. This will open the clutch circuit of the slides which passes through the switch 160, and the clutch circuits will be automatically interrupted, while the brake circuits will be rendered active and the brakes will be applied, stopping all slides. That is, as the slides reach a predetermined relative position, the normally closed circuit, including the switch 160, will be opened, causing the relay on the panel 140 to break the clutch circuits.

By manually closing the switch 167, the current will by-pass or be shunted around the switch 160, so that the clutches may be operated by the "inching" switch to move the slides to their proper positions.

While the preferred form of the invention has been herein shown and described, it is to be understood that various changes may be made in the details of construction and in the combination and arrangement of the several parts, and while magnetic clutch devices have been herein shown and described, the identical control may, however, be used with any other type of clutch device, such as fluid or other type of control mechanism. In the event, however, that fluid clutches are employed, the circuits of the solenoids of the clutch devices would be replaced with fluid controlling valves and the circuits of the solenoid fluid controlling valves would be made and interrupted in the same manner as the clutch circuit itself in the present exemplification of the invention is made and interrupted, within the scope of the claims, and without departing from the spirit of this invention.

What is claimed as new is:

1. In a sheet metal press, a plurality of die slide members, actuating mechanisms individual to the slide members, a constantly rotating source of power from which said slides are normally disconnected, said actuating mechanisms embodying clutch devices for connecting the respective slides to the source of power to be operated thereby and for disconnecting them from the source of power whereby to obtain a dwell in the movement of the disconnected slide, means from which said connecting mechanisms are to be operated in different sequence, sequence adjusting means individual to the connecting means, and mechanism for freely and selectively setting said sequence adjusting means at any time during the cycle of operation of the press.

2. In a sheet metal press, a plurality of die slide members, actuating mechanisms individual to the slide members, a constantly rotating source of power from which said slides are normally disconnected, said actuating mechanism embodying clutch devices for connecting the respective slides to the source of power to be operated thereby and for disconnecting them from the source of power whereby to obtain a dwell in the movement of the disconnected slide, means from which said connecting mechanisms are to be operated in different sequence, sequence adjusting means individual to the said connecting means, mechanism for freely and selectively setting said sequence adjusting means at any time during the operation of the press and while all of the parts of the last said means remain intact, means individual to and responsive to the operation of the respective slides for separately controlling the operation of the slides, and means individual to and operable by the slide operating means for indicating at all times the position of the slides with respect to the work during the operation of the slides.

3. In a sheet metal press, a plurality of die slide members, actuating mechanisms individual to the slide members, a constantly rotating source of power from which said slides are normally disconnected, said actuating mechanisms embodying clutch devices for connecting the respective slides to the source of power to be operated thereby and for disconnecting them from the source of power whereby to obtain a dwell in the movement of the disconnected slide, means from which said connecting mechanisms are to be operated in different sequence, sequence adjusting means individual to the said connecting means, mechanism for freely and selectively setting said sequence adjusting means at any time during the operation of the press, and means operating automatically to arrest the movement of one of the slides when the latter reaches a predetermined point in its movement with respect to the other slide for preventing one slide from moving in advance of the other slide.

4. In a sheet metal press, a plurality of die slide members, actuating mechanisms individual to the slide members, a constantly rotating source of power from which said slides are normally disconnected, said actuating mechanisms embodying clutch devices for connecting the respective slides to the source of power to be operated thereby and for disconnecting them from the source of power whereby to obtain a dwell in the movement of the disconnected slide, means from which said connecting mechanisms are to be operated in different sequence, sequence adjusting means individual to the said connecting means, mechanism for freely and selectively setting said sequence adjusting means at any time during the operation of the press, means operating automatically to arrest the movement of one of the slides when the latter reaches a predetermined point in its movement with respect to the other slide for preventing one slide from moving in advance of the other slide, and means embodying an electric shunt circuit around the last said means for rendering the latter inactive.

5. In a sheet metal press, a plurality of die slide members, actuating mechanisms individual to the slide members, a constantly rotating source of power from which said slides are normally disconnected, said actuating mechanisms embodying clutch devices for connecting the respective slides to the source of power to be operated thereby and for disconnecting them from the source of power whereby to obtain a dwell in the movement of the disconnected slide, means from which said connecting mechanisms are to be operated in different sequence, and sequence adjusting means individual to the said connecting means, and mechanism for freely and selectively setting said sequence adjusting means at any time in the cycle of operation of the press and while the parts of the sequence adjusting means remain intact, the said sequence adjusting means being disposed remote from their respective said connecting mechanisms, but in close proximity to each other and being freely adjustable at any time during the cycle of operation of the press.

6. A press having a plurality of die slide members, operating means for said members, means from which said slides are operated in different sequence, sequence adjusting means, mechanism for freely and selectively setting said sequence adjusting means at any time during the operation of the press, to cause the slides to operate in any predetermined order or sequence, an operative connection between the said operating means and the said sequence adjusting means for operating the latter, and means operable to cause certain of said die slide members to be gradually moved, or "inched" towards the work.

7. A press having a bed, a plurality of die slide members, on one side of the bed, a die slide member on the other side of the bed, means for reciprocating the die slide members, the said means embodying clutch devices individual to the die slide members, means operable by the die slide actuating means for controlling said clutch devices, the last said means embodying controlling elements for said clutch devices, sequence controlling means, and means for freely and selectively setting said sequence controlling means at any time while the press is in operation and while all of the parts of the said sequence adjusting means and the said controlling elements remain intact, to cause the die slide members to operate in any predetermined order or sequence.

8. In a drawing press, a bed, a plurality of reciprocable die slide members on one side of the bed, a die slide on the other side of the bed, clutch devices individual to the die slides for controlling the reciprocation thereof, controlling means for said clutch devices to render the die slide members active and inactive and for causing the die slide members to reciprocate in any predetermined order or sequence, and mechanism for freely and selectively setting said controlling means at any time during the cycle of operation of the press, while the parts of the controlling and the setting mechanism remain intact, for varying the order or sequence of operation of the slides.

9. In a sheet metal press, a plurality of die slide members, actuating mechanisms individual to the slide members, a constantly rotating source of power from which said slides are normally disconnected, said actuating mechanism embodying clutch devices for connecting the respective slides to the source of power to be operated thereby and for disconnecting them from the source of power, whereby to obtain a dwell in the movement of the disconnected slides, means from which said connecting mechanisms are to be operated in different sequence, sequence adjusting means individual to the said connecting means and embodying mechanism to selectively set the same at any time during the cycle of operation of the press, means individual to and responsive in operation to the respective slide operating mechanisms for separately controlling the operation of the controlling means of certain of the other of said slides, the said sequence adjusting means embodying contact bars, a contact for cooperation with each of said contact bars, a member individual to and carrying each of said contacts, the last said member mounted for rotative adjustment to bodily adjust said contacts, rotative discs individual to said contacts for also controlling the latter whereby to control the make and break between said contacts and the respective said contact bars, a portion of the periphery of each of said discs being cut away, an operating shaft connected with each of said contact carrying members for rotatively adjusting them and the respective contacts carried thereby, with relation to the respective said discs, whereby to set the said contacts with respect to the said cutaway portions of the respective discs, adapting the respective said contacts to close the circuit respectively at a predetermined time in the cycle of rotation of said discs.

10. A press having a plurality of die slide members, operating means for said members, mechanism adapted to be freely and selectively set to subsequently cause the slides to operate in any predetermined order or sequence, the last said mechanism embodying cooperating make and break elements one of which is fixed against free adjustment and the other of which is mounted for free relative bodily adjustment, a rotatable disc element a portion of the periphery of which operates to render the make and break elements inactive and another portion of the periphery being cut away and operating to render the make and break elements active, said rotatable disc and one of the make and break elements having a fixed set relation to each other, and means for bodily adjusting at will one of the said make and break elements and the said rotatable disc, one with relation to the other, to vary their said fixed set relation, at any time during the cycle of operation of the press.

11. A press having a plurality of die slide members, operating means for said members, mechanism adapted to be freely and selectively set to cause the slides to subsequently operate in any predetermined order or sequence, the last said mechanism embodying cooperating make and break elements one of which is fixed against free adjustment and the other which is mounted for free relative bodily adjustment, a rotatable disc element a portion of the periphery of which operates to render the make and break elements inactive and another portion of the periphery being cut away and operating to render the make and break elements active, said rotatable disc and one of the said make and break elements having a fixed set relation to each other, means for bodily adjusting at will one of the said make and break elements and the said rotatable disc, one with relation to the other, to vary their said fixed set relation at any time during the cycle of operation of the press, and means individual to the die slide members for indicating their position with relation to the limit of the stroke of the respective die slide members.

12. A press having a plurality of die slide members, operating means for the said members, mechanism adapted to be selectively set to cause the slides to operate in any predetermined order or sequence, the said mechanism embodying a rotatable disc having a portion of its periphery removed, a make and break device embodying a fixed contact bar and a contact member, the latter mounted for free bodily movement about the periphery of the disc and with respect to the said contact bar, means whereby the removed portion of said disc will operate to render the said contact member and contact bar active with respect to each other, the remaining portion of the periphery of the disc operating to render the contact member and contact bar inactive with respect to each other, the said contact member and the said removed portion of the disc having a fixed set relation, and means for moving the said contact member with respect to the disc to vary at will the said fixed set relation of the said contact member and the said removed portion of the periphery of the said disc.

13. A controlling device for the operation of the slides of a press, said device embodying a rotatable disc having a portion of its periphery removed, a make and break device embodying a fixed contact bar and a contact member, the latter being carried by a pivotally mounted support, said contact member having a fixed set relation to the removed portion of the periphery of said disc to render the contact member and contact bar active with respect to each other, the remaining portion of the disc operating to render the contact member and contact bar inactive with respect to each other, and means accessible from the outside of said device for swinging said support about its pivot to position the contact member carried thereby, to vary the fixed set relation of the said contact member with respect to the said removed portion of the periphery of said disc.

14. In a sheet metal press, a plurality of die slide members, actuating mechanisms individual to the slide members, a constantly rotating source of power from which said slides are normally disconnected, said actuating mechanisms embodying clutch devices for connecting the respective slides to the source of power to be operated thereby and for disconnecting them from the source of power whereby to obtain a dwell in the movement of the disconnected slide, means from which said connecting mechanisms are to be operated in different sequence, sequence adjusting means individual to said connecting means and embodying mechanism adapted to be set selectively at any time during the operation of the press, said sequence adjusting means embodying contact bars, a contact cooperating with each of said bars, a member individual to and carrying the respective contact members, the said carrying members mounted for rotative adjustment to bodily adjust said contact members, rotative discs individual to said carrying members for controlling said contact members with respect to said contact bars, said contact members and said rotatable elements each having a fixed set relation to each other, and means for varying at will the said fixed relation whereby the sequence adjusting means may be varied at any time in the cycle of operation of the press.

15. In a sheet metal press, a plurality of die slide members, actuating means individual to the slide members, a constantly rotating source of power from which said slides are normally disconnected, said actuating mechanism embodying clutch devices for connecting the respective slides to the source of power to be operated thereby and for disconnecting them from the source of power, whereby to obtain a dwell in the movement of the disconnected slide, means from which said connecting mechanisms are to be operated in different sequence, sequence adjusting means individual to the said connecting means adapted to be set selectively at any time during the operation of the press, said sequence adjusting means embodying a shaft separate and remote from said source of power, a plurality of discs mounted upon and rotatable with said shaft, a portion of the periphery of the discs being removed, pivotally mounted contact carrying members individual to the discs, a contact carried by each of said members and cooperating with the periphery of the respective discs, said contact carrying members having fixed set position with relation to the respective discs, contact bars individual to the discs and adapted to be engaged by the respective contact members when the latter are adjacent the cutaway portions of the discs, an operative connectiton between said shafts and said source of power, and means individual to said contact carrying members for freely adjusting the latter to vary the said fixed relation.

16. In a sheet metal press, a plurality of die slide members, actuating means individual to the slide members, a constantly rotating source of power from which said slides are normally disconnected, said actuating mechanism embodying clutch devices for connecting the respective slides to the source of power to be operated thereby and for disconnecting them from the source of power, whereby to obtain a dwell in the movement of the disconnected slide, means from which said connecting mechanisms are to be operated in different sequence, sequence adjusting means individual to the said connecting means adapted to be set selectively at any time during the operation of the press, said sequence adjusting means embodying a shaft separate and remote from said source of power, a plurality of discs mounted upon and rotatable with said shaft, a portion of the periphery of the discs being removed, pivotally mounted contact carrying members individual to the discs, a contact carried by each of said members and cooperating with the periphery of the respective discs, said contact carrying members having fixed set position with relation to the respective discs, contact bars individual to the discs and adapted to be engaged by the respective contact members when the latter are adjacent the cutaway portions of the discs, an operative connection between said shafts and said source of power, means individual to said contact carrying members for freely adjusting the latter to vary the said fixed relation, the last said means embodying operating shafts connected with the respective contact carrying members, handles individual to the last said shafts for rotating them, and indicating means for indicating the said fixed position of the contact carrying member and the respective said discs.

RUDOLPH W. GLASNER.